United States Patent [19]

Brömer

[11] 4,160,198

[45] Jul. 3, 1979

[54] NUMERICALLY-CONTROLLED MACHINE TOOL

[75] Inventor: Günter Brömer, Spardorf, Fed. Rep. of Germany

[73] Assignee: Siemens Aktiengesellschaft, Munich, Fed. Rep. of Germany

[21] Appl. No.: 841,283

[22] Filed: Oct. 12, 1977

[30] Foreign Application Priority Data

Oct. 28, 1976 [DE] Fed. Rep. of Germany ....... 2649115

[51] Int. Cl.$^2$ ............................................. G05B 23/02
[52] U.S. Cl. .................................... 318/565; 318/603; 318/632; 318/653
[58] Field of Search ................. 318/565, 603, 632, 653

[56] References Cited

U.S. PATENT DOCUMENTS

| 3,596,189 | 7/1971 | Luteran | 318/653 |
| 3,676,659 | 7/1972 | Asmussen | 318/632 |
| 3,684,961 | 8/1972 | Muir | 318/653 X |

*Primary Examiner*—B. Dobeck
*Attorney, Agent, or Firm*—Kenyon & Kenyon

[57] ABSTRACT

An improved numerically-controlled machine tool including means for adding incremental set values, which depend on a programmed input, and incremental actual values, generated by a self-balancing distance measuring system, at defined time intervals to a set distance value and an actual distance value, and means for forming a set speed value for a controller of an input drive by the difference between the set distance value and the actual distance value. The difference between the values is proportional to a lag distance, and the self-balancing distance measuring system comprises an inductive measuring transducer which is fed from a primary side thereof and which generates a secondary error voltage on the secondary side thereof, the magnitude and polarity of which depends on the position of a flux vector generated on the primary side relative to the position of a secondary winding of the transducer. The transducer also includes means for generating pulse signals which are proportional to the secondary error voltage for servoing the flux vector in the direction toward balance and measuring the actual value of the distance travelled by the secondary winding. The improvement of the invention comprises the measuring transducer including means for briefly rotating the flux vector through defined angles in sensing intervals of an incremental, actual-value interrogation, and means for detecting polarity changes in the secondary error voltage.

3 Claims, 3 Drawing Figures

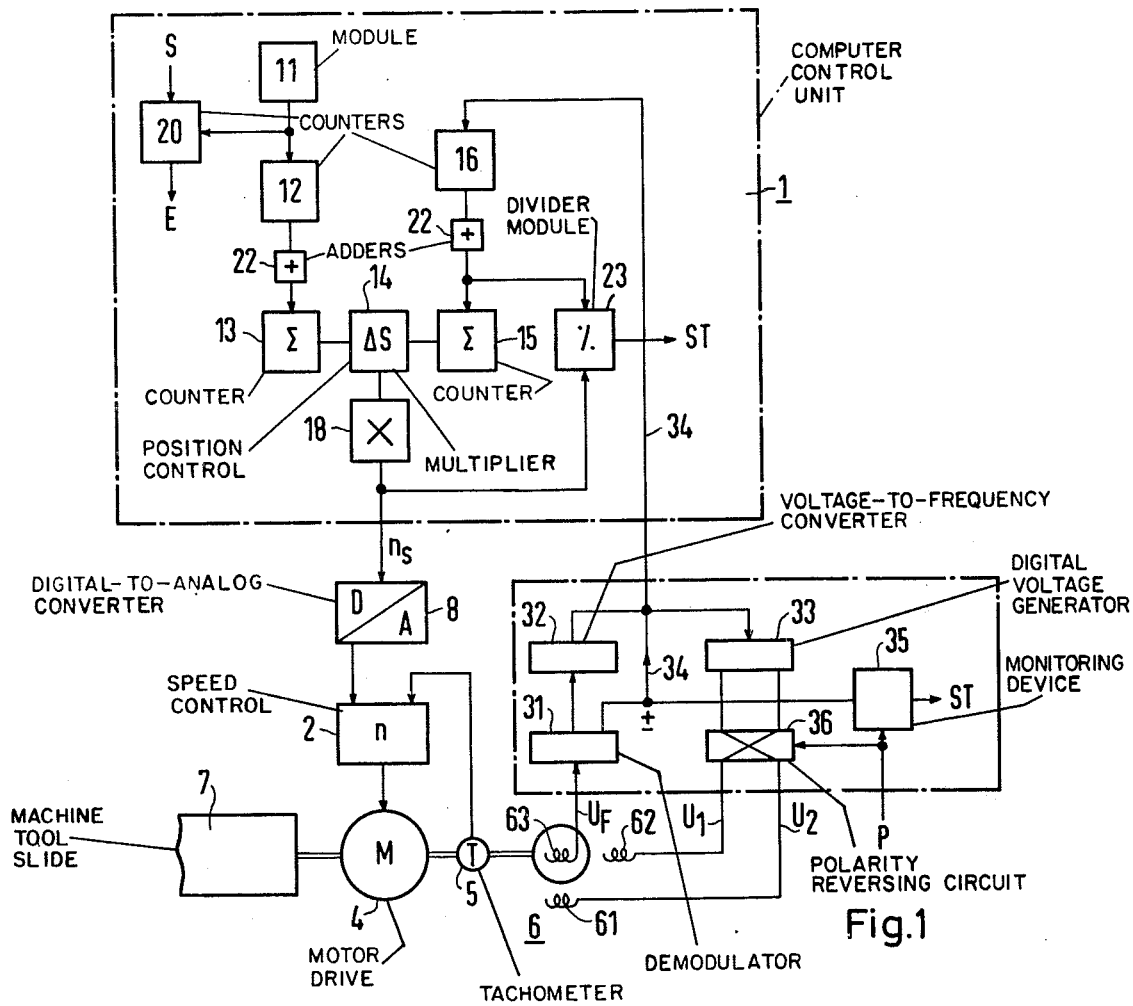
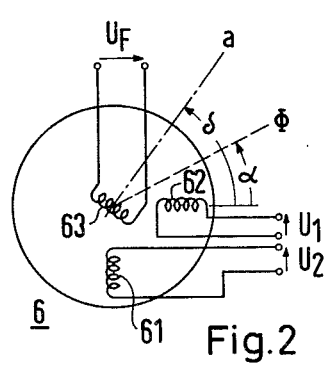
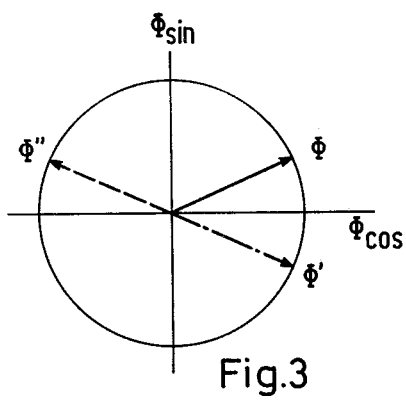

NUMERICALLY-CONTROLLED MACHINE TOOL

BACKGROUND OF THE INVENTION

1. Field of the Invention

This invention relates generally to numerically-controlled machine tools, and in particular to an improved numerically-controlled machine tool including a self-balancing distance measuring system.

2. Description of the Prior Art

Numerically-controlled machine tools of the foregoing general type include means for adding partial, i.e., incremental set values, which depend on a programmed input, and partial actual values, which are generated by self-balancing distance measuring system, at defined time intervals to a set distance value and an actual distance value, and means for forming a set speed value for a controller of an input drive by the difference between the set distance value and the actual distance value, with the difference being proportional to a lag distance. The self-balancing distance measuring system in such machine tools comprises an inductive measuring transducer which is fed from the primary side of the transducer and which generates a secondary error voltage on the secondary side thereof, the magnitude and polarity of which depends upon the position of a flux vector generated on the primary side of the transducer relative to the position of a secondary winding of the transducer. The transducer further includes means for generating pulse signals which are proportional to the secondary error voltage for servoing the flux vector in the direction toward balance and measuring the actual value of the distance travelled by the secondary winding. The foregoing type of machine tool is described, for example in SINUMERIK Catalog 550 C, Part 3, October, 1974, particularly FIGS. 1 and 6, and the foregoing type of self-balancing measuring system, in Siemens-Zeitschrift 1973, pages 12 through 15, particularly FIGS. 2 and 3, in the supplement "Controls and Drives for Automating Machine Tools".

Process computers, the so-called CNC controls, are being more frequently used today for the control of machine tools. In such controls, the desired, i.e., set, distance value, which is varied in accordance with predetermined conditions, is compared with the actual distance value and a speed-command variable for a feed drive at the machine is thereby formed. Due to the operation of the sensing control, the set value and the actual value are generated from respective incremental set values and incremental actual values, i.e., the respective set and actual values are varied by an amount which has accumulated as the variance within a given time, for example 8 milliseconds. This means that only the actual value variance can be determined within the 8 milliseconds and that in the sensing intervals, an externally-created variation of the actual value is not detected as interference.

SUMMARY OF THE INVENTION

It is an object of the invention to provide an improved numerically-controlled machine tool in which it is possible to operationally monitor the self-balancing measuring circuits of the machine tool in order to detect errors.

This and other objects of the invention are achieved in a numerically-controlled machine tool including means for adding incremental set values, which depend on a programmed input, and the incremental actual values, generated by a self-balancing distance measuring system, at defined time intervals to a set distance value and an actual distance value, and means for forming a set speed value for a controller of an input drive by the difference between the set distance value and the actual differences value, the difference being proportional to a lag distance. The self-balancing distance measuring system comprises an inductive measuring transducer which is fed from a primary side thereof and which generates a secondary error voltage on the secondary side thereof, the magnitude and polarity of which depends on the position of a flux vector generated on the primary side relative to the position of a secondary winding of the transducer. The transducer also includes means for generating pulse signals which are proportional to the secondary error voltage for servoing the flux vector in the direction toward balance and measuring the actual value of the distance travelled by the secondary winding. The improvement of the invention comprises the measuring transducer including means for briefly rotating the flux vector through defined angles in sensing intervals of an incremental actual value interrogation, and means for detecting polarity changes in the secondary error voltage.

In a preferred embodiment of the invention, the rotating means may comprise means for sequentially reversing the polarity of input voltages generated on the primary side of the transducer. Thus, for example, if such a polarity change does not occur within two successive reversals of the feed, this will indicate a disturbance in the measuring system.

In a further preferred embodiment of the invention, the machine tool comprises means for dividing the incremental actual value by a calculated set speed value. Using this arrangement, it can be determined that a disturbance must be present if the result of division deviates substantially from the value 1 since the instant incremental actual value also functions as a measure of the speed.

These and other novel features and advantages of the invention will be described in greater detail in the following detailed description.

BRIEF DESCRIPTION OF THE DRAWINGS

In the drawings, wherein similar reference numerals denote similar elements throughout the several views thereof:

FIG. 1 is a schematic block diagram of an improved numerically-controlled machine tool constructed according to the present invention;

FIG. 2 is a schematic diagram of a measuring transducer for use in a numerically-controlled machine tool constructed according to the present invention; and FIG. 3 is a graphical diagram illustrating rotation of a flux vector by reversing the polarity of feed voltages in the measuring transducer of a numerically-controlled machine tool constructed according to the present invention.

DETAILED DESCRIPTION

Referring now to the drawings, the objective of the invention is to operate a machine tool slide 7 so as to move the slide into a desired position by means of an electrical drive motor 4. In order to achieve this, a speed control 2 is coupled to the drive motor and receives an actual value signal from a tachometer generator 5 also coupled to the motor. The set speed value of the speed control 2 is transmitted by means of a digitalto-analog converter 8 from a computer control unit 1, the latter of which generates this value from the control data entered into the computer and the actual distance value provided by a measuring transducer 6.

The operation of the computer control unit is as follows:

In accordance with predetermined criteria, particularly the desired speed, reference, i.e., set value pulses are generated in a module 11 and are transmitted to a counter 12 where the pulses are added. After a predetermined time interval, for example, 8 milliseconds, the content of counter 12 is added by means of an adder 22 to the count of another counter 13. At this point, the count of counter 13 comprises the respective set distance value, which is always varied by the incremental set value of counter 12. The final set value is reached when the number of pulses generated by module 11 corresponds to the total distance s to be travelled. This count is monitored by another counter 20 which then indicates the end E of the set-in reference value. Simultaneously with the set-in reference value, the computer control unit 1 retrieves in the same time raster, i.e., every 8 milliseconds, the incremental actual value present in the incremental actual-value counter 16, i.e., the change of the actual distance value in these 8 milliseconds, and adds it by means of another adder 22 to the actual value count in another counter 15. A value proportional to the difference between the set value and the actual value is generated from the contents of counters 13 and 15 in a position control 14 coupled to the counters. This value is set into the digital-to-analog converter 8 by means of a multiplier 18 coupled to control 14 as the speed reference value. The changes in the actual distance value are transmitted to the incremental actual-value counter 16 by means of a transmission line 34 from the self-balancing measuring system.

The operation of the self-balancing measuring system of the machine tool will now be described with reference to FIG. 2:

A rotation indicator 6, which is coupled to drive motor 4 and serves as a measuring transducer, has a pair of 90°-shifted primary windings 61 and 62 in the stator of the transducer and a secondary winding 63 which rotates with the rotor of the transducer. The induced error voltage $U_F$ in the secondary winding 63 has a value of zero if the coil direction $\delta$ of the winding 63, which is disposed perpendicular to the coil axis, coincides with the direction $\alpha$ of the resultant flux vector, which is produced by the ratio of the two voltages U1 and U2 generates in the primary windings 61 and 62 (sine-cosine feeding). As long as the coil direction $\delta$ does not agree with the field direction $\delta$, the voltage $U_F \sin(\delta - \alpha)$ is induced in winding 63. The principle of operation of the self-balancing distance measuring system is that the voltages U1 and U2, and therefore the vector $\Phi$, are rotated so that the angle difference $\delta - \alpha$ is always zero. If the rotor is coupled to the part of the machine which is to be moved, the vector $\Phi$ must be made to continuously follow the rotation of the moved machine part. To achieve this, the error voltage $U_F$ is phase-dependently demodulated in a demodulator 31 coupled to winding 63 and is transmitted to a voltage-to-frequency converter 32 which generates a corresponding pulse frequency. These pulses are transmitted to a digital voltage generator 33 which generates the voltages U1 and U2 which cause the rotation of the field direction in the measuring transducer (synchro transmitter) to continuously follow the coil direction and, thereby, reduce the error voltage $U_F$. The principles of operation of the self-balancing distance measuring circuit and the digital voltage generator (sine-cosine generator) are described in detail in Siemens-Zeitschrift 1973, pages 12–16, in the supplement on controls and drives for automatic machine tools.

The pulses generated by voltage-to-frequency converter 32 simultaneously serve as a measure of the change of the actual value and, thus, can be transmitted to the incremental actual-value counter 16 in accordance with the sign obtained in demodulator 31.

To check the operability of the measuring system, the flux vector $\Phi$, which is determined by voltages U1 and U2, is rotated for a half a millisecond in the sensing intervals, e.g., always 2 milliseconds after taking over the incremental actual value. This is achieved first by reversing the polarity of the voltage U1 in the position $\Phi''$ (mirror reflection at the axis $\Phi_{sin}$) and subsequently, by reversing the polarity of the voltage U2 into the position $\Phi'$ (mirror reflection at the axis $\Phi_{cos}$). Since, as a result, the vector always comes to rest in a different quadrant, the polarity of the error voltage $U_F$ must have changed at least once during these brief vector rotations (see FIG. 3).

Electronically, this test can be performed, for example, by connecting a polarity-reversing circuit stage 36 between digital voltage generator 33 and the measuring transducer 6. Circuit stage 36 will, upon receiving a command signal P, briefly sequentially reverse the polarity of individual voltages U1 and U2, respectively. The resulting polarity change of the error voltage at the output terminal of demodulator 31 is detected in a monitoring device 35. The absence of the polarity change is a criterion for indicating a disturbance ST.

The brief voltage polarity reversal has no effect on the measurement result interrogated in the time raster since the increase in the measurement value which occurred due to the brief electrical rotation of the flux vector is subsequently eliminated just as rapidly by the self-balancing of the measuring system.

Another check for disturbance may be carried out by dividing the incremental actual value which is present in the counter 16 by the digital speed reference value present at the output terminal of multiplier 18. If the division in a divider module 23 coupled between counter 16 and multiplier 18 generates a signal which deviates in value too far from the value 1, a disturbance signal ST is generated.

In the foregoing specification, the invention has been described with reference to specific exemplary embodiments thereof. It will, however, be evident that various modifications and changes may be made thereunto departing from the broader spirit and scope of the invention as set forth in the appended claims. The specification and drawings are, accordingly, to be regarded in an illustrative rather than in a restrictive sense.

What is claimed is:

1. In a numerically-controlled machine tool including means for adding incremental set values, which depend on a programmed input, and incremental actual values, generated by a self-balancing distance measuring system, at defined time intervals to a set distance value and an actual distance value, and means for forming a set speed value for a controller of an input drive by the difference between the set distance value and the actual distance value, said difference being proportional to a lag distance, said self-balancing distance measuring system comprising an inductive measuring transducer which is fed from a primary side thereof and which generates a secondary error voltage on the secondary side thereof, the magnitude and polarity of which depends on the position of a flux vector generated on said primary side relative to the position of a secondary winding of said transducer, and means for generating pulse signals which are proportional to the secondary error voltage for servoing the flux vector in the direction toward balance and measuring the actual value of the distance travelled by said secondary winding, the improvement comprising, said measuring transducer including means for briefly rotating said flux vector through defined angles in sensing intervals of an incremental actual-value interrogation, and means for detecting polarity changes in said secondary error voltage.

2. The improvement recited in claim 1, wherein said rotating means comprises means for sequentially reversing the polarity of input voltages generated on the primary side of said transducer.

3. The improvement recited in claim 1, further comprising means for dividing the incremental actual value by a calculated set speed value.

* * * * *